Patented May 12, 1931

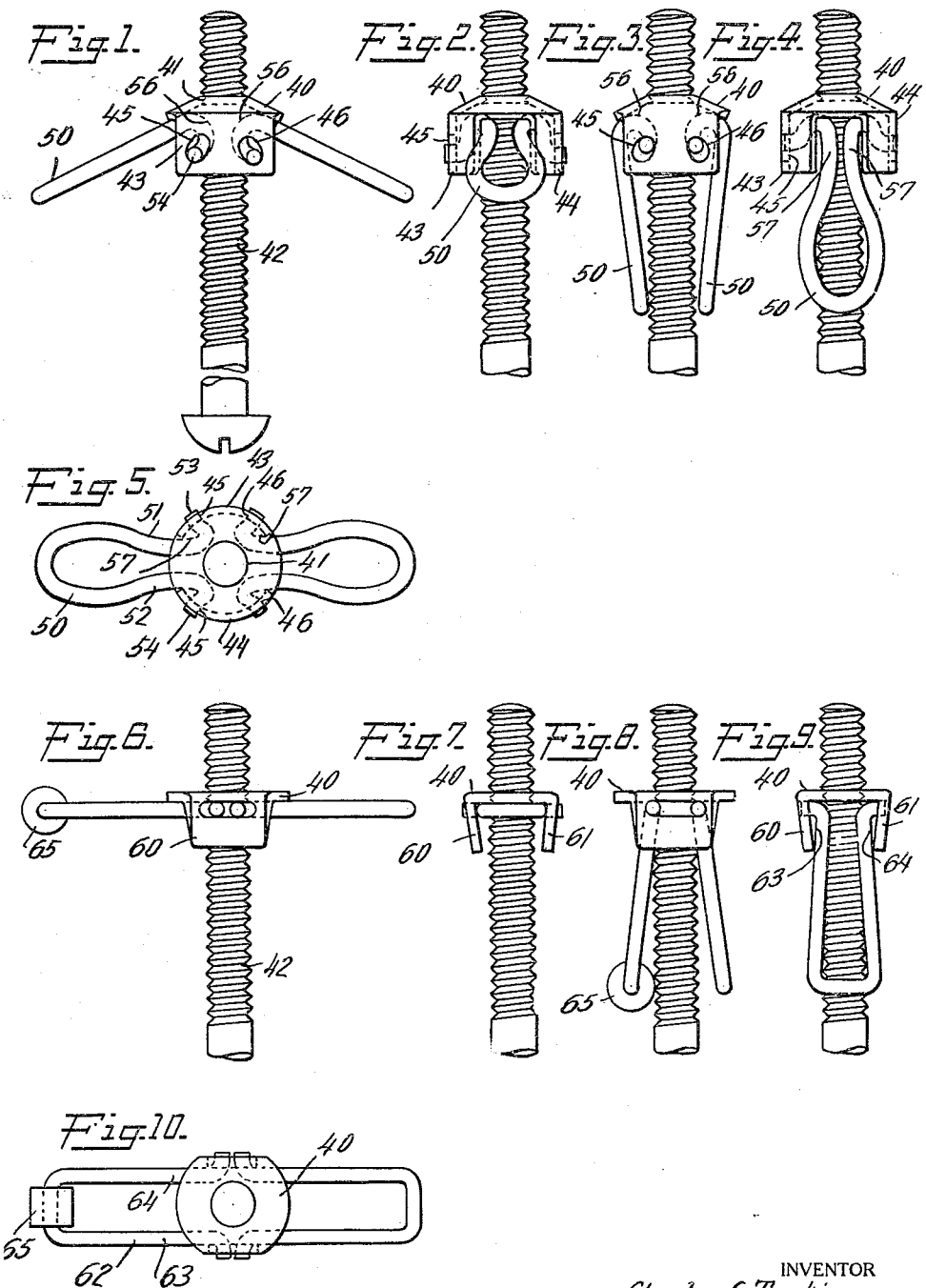

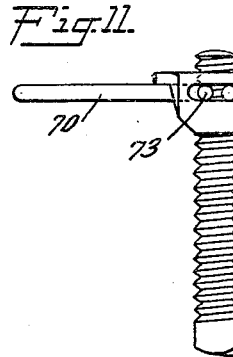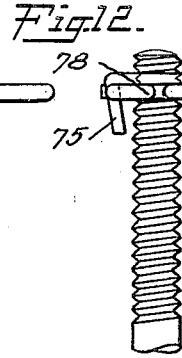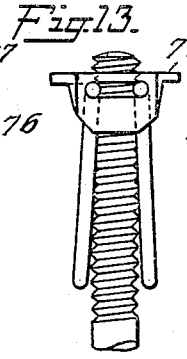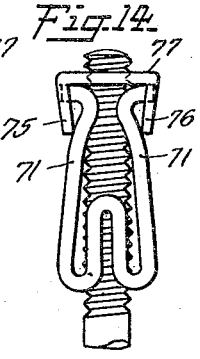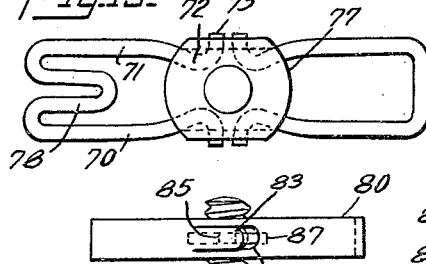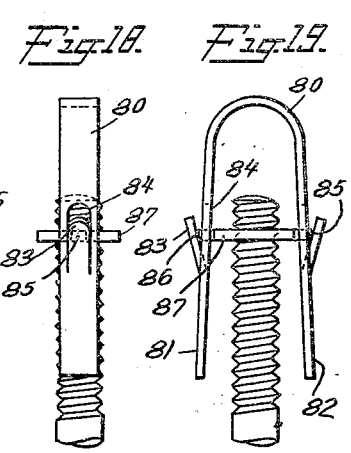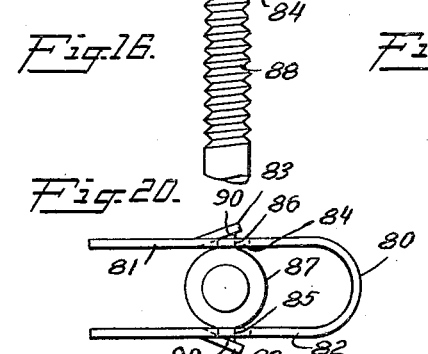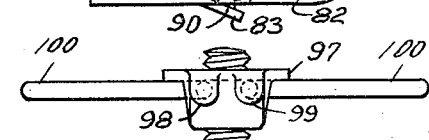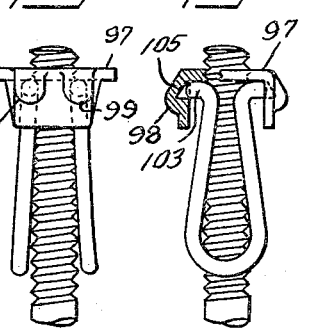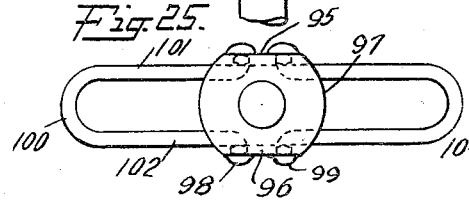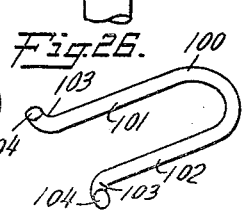

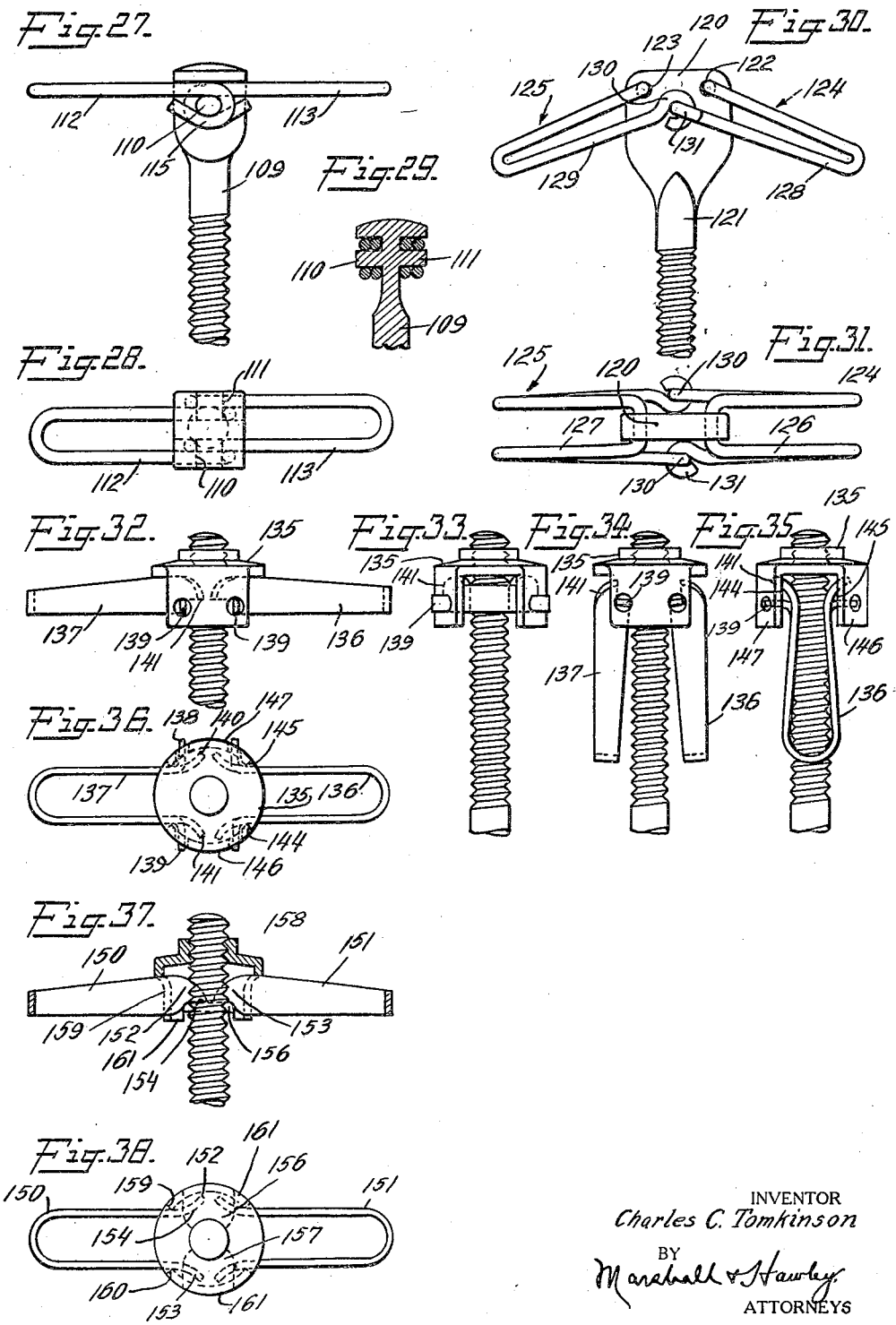

1,805,319

UNITED STATES PATENT OFFICE

CHARLES C. TOMKINSON, OF PLAINFIELD, NEW JERSEY, ASSIGNOR, BY MESNE ASSIGNMENTS, TO J. EDWARD OGDEN COMPANY, OF NEW YORK, N. Y., A CORPORATION OF NEW JERSEY

TOGGLE BOLT

Application filed March 10, 1927. Serial No. 174,130.

This invention relates to toggle bolts, such as are used for securing articles to walls or ceilings of brick, stone or cementitious material not adapted to directly receive a threaded member.

This invention has for its salient object to provide a toggle bolt that is simple and practical in construction, comprises a minimum number of parts and is efficient in operation. Another object of the invention is to provide a toggle bolt having a wing and nut so constructed and arranged as to form a strong anchorage capable of sustaining relatively heavy loads.

Further objects of the invention will appear from the following specification taken in connection with the drawings, which form a part of this application, and in which Fig. 1 is an elevation of one form of toggle bolt constructed in accordance with the invention, the wings being spread or swung laterally to operative position;

Fig. 2 is an elevation taken at right angles to Fig. 1;

Fig. 3 is a view similar to Fig. 1, but showing the wings in folded position;

Fig. 4 is an elevation taken at right angles to Fig. 3;

Fig. 5 is a top plan view of the structure shown in Fig. 1;

Fig. 6 is a view similar to Fig. 1, but showing a slightly different embodiment of the invention;

Fig. 7 is a view taken at right angles to Fig. 6;

Fig. 8 is a view similar to Fig. 6, but showing the wings in folded position;

Fig. 9 is a view taken at right angles to Fig. 8;

Fig. 10 is a top plan view of the structure shown in Fig. 6;

Fig. 11 is a view similar to Fig. 1, but showing another embodiment of the invention;

Fig. 12 is a view taken at right angles to Fig. 11;

Fig. 13 is a view similar to Fig. 11, but showing the wings in folded position;

Fig. 14 is a view taken at right angles to Fig. 13;

Fig. 15 is a top plan view of the structure shown in Fig. 11;

Fig. 16 is a view similar to Fig. 1, but showing a further embodiment of the invention;

Fig. 17 is a view taken at right angles to Fig. 16;

Fig. 18 is a view similar to Fig. 16, but showing the wing disposed in a position parallel to the bolt;

Fig. 19 is a view taken at right angles to Fig. 18;

Fig. 20 is a top plan view of the structure shown in Fig. 16;

Fig. 21 is a view similar to Fig. 1, but showing another embodiment of the invention;

Fig. 22 is a view partly in section taken at right angles to Fig. 21;

Fig. 23 is a view similar to Fig. 21, but showing the wings folded;

Fig. 24 is a view taken at right angles to Fig. 23 and partly in section;

Fig. 25 is a top plan view of the structure shown in Fig. 21;

Fig. 26 is a perspective view showing one of the wings used in the form of the invention in Figs. 21 to 25 inclusive;

Fig. 27 is a view similar to Fig. 1, but illustrating a further embodiment of the invention;

Fig. 28 is a top plan view of the structure shown in Fig. 27;

Fig. 29 is a sectional elevation of the structure shown in Fig. 27;

Fig. 30 is a view similar to Fig. 1, but showing another embodiment of the invention;

Fig. 31 is a top plan view of the structure shown in Fig. 30;

Fig. 32 is an elevational view similar to Fig. 1, but showing another embodiment of the invention;

Fig. 33 is an elevational view taken at right angles to Fig. 32;

Fig. 34 is a view similar to Fig. 32, but showing the wings folded;

Fig. 35 is a view in elevation taken at right angles to Fig. 34;

Fig. 36 is a top plan view of the structure shown in Fig. 32;

Fig. 37 is an elevational view partly in section showing another embodiment of the invention; and Fig. 38 is a top plan view of the structure shown in Fig. 37.

The invention briefly described consists of a toggle bolt comprising a wing supporting member which in some embodiments of the invention takes the form of a saddle or nut and in other embodiments of the invention consists of the bolt itself and a wing or wings carried by the wing supporting member. Each wing is formed of resilient material and the wing and supporting member are so relatively constructed and arranged that a force due to the resilient nature of the material will be exerted in a direction to cause the wing to swing outwardly or laterally to open position. Particular attention is called to the fact that no spring or other equivalent elements are required since the resiliency of the wing itself tends to swing the wing to open position. Thus the number of parts is kept down to a minimum. Further details of the invention will appear from the following description.

Figs. 1 to 5 inclusive

In this form of the invention the toggle bolt comprises a saddle member 40 having a central threaded opening 41 adapted to receive the bolt 42. The saddle member has depending lugs 43 and 44, each lug having a pair of openings 45 and 46, the openings 45 and 46 in the two lugs being disposed opposite each other and in alinement.

Each wing consists of a U-shaped member 50 formed of resilient material and having legs 51 and 52, the ends of the legs as shown at 53 and 54 being bent laterally and extend through the openings 45 and 46, thus forming pivots or trunnions for the wings.

From the showing in Figs. 1 to 5, it will be noted that the portions of the legs adjacent the laterally bent ends 53 and 54 are curved outwardly and downwardly as shown at 56. Since the wings are formed of resilient material, the legs 51 and 52 tend to spread apart and because of their curvature when they are folded downwardly to the position shown in Figs. 3 and 4, the inwardly curved portions 57 of the legs are contracted or moved toward each other. When the wings are released, the legs tend to spread apart and because of the curvature and the bearing of the legs against contacting portions of the saddle, the wings are automatically swung upwardly or spread to open position. It will be noted that the saddle 40 is arched or convex in shape. This construction is particularly advantageous since it is necessary for the proper operation of a toggle bolt to have a loose fit between the thread of the bolt and the saddle. When the wings engage the wall through which the bolt extends, further turning of the bolt in the saddle will cause the saddle to bend, due to its ductility, and to tightly grip the bolt.

Figs. 6 to 10 inclusive

In this form of the invention the saddle member or toggle head 40 has depending lugs 60 and 61 which as shown in Fig. 7 converge slightly or are inclined slightly toward each other.

Each wing 62 has legs 63 and 64 which are substantially parallel when the wing is spread to open position. However, when the wing is folded against the bolt 42, the depending lugs 60 and 61 function as cams to contract the legs 63 and 64 of the wing as shown in Fig. 9. It will be noted, however, that when the wings are contracted by the cams or are disposed in folded position, they do not extend far enough between the cams to prevent their automatically springing outwardly when they are released.

If desired, in order to prevent rotation of the wings when the bolt is being rotated through the saddle, one of the wings may have a weight 65 secured to its outer end. This weight will tend to hold the wing 63 on which the weight is mounted in a position below the bolt, thus preventing the rotation of the wing and saddle member as the bolt is rotated.

Figs. 11 to 15 inclusive

The embodiment of the invention illustrated in Figs. 11 to 15 inclusive incorporates features of the invention shown in the forms illustrated in Figs. 1 to 5 inclusive and the forms illustrated in Figs. 6 to 10 inclusive. From the showing in Fig. 15 it will be evident that the legs of the wings are curved in a manner similar to the legs of the wings shown in Fig. 5; that is to say, the legs 70 and 71 are curved inwardly at 72 and laterally at 73.

From the showing in Figs. 12 and 14 it will be evident that the depending lugs 75 and 76 carried by the saddle 77 are inclined toward each other or converge in a manner similar to the lugs 60 and 61 in Figs. 7 and 9. These lugs, therefore, function as cams.

In Fig. 14 the legs 70 and 71 are shown as contracted at their upper ends, this contraction being due both to the curvature of the portions 72 of the legs and to the cam action of the lugs 75 and 76.

One of the wings has its outer end bent inwardly as shown at 78, thus providing excess material at the outer end of this wing which functions to weight the wing to prevent the rotation of the saddle member and wings when the bolt is rotated.

Figs. 16 to 20 inclusive

In this embodiment of the invention there is shown a single wing comprising a U-shaped member 80 having legs 81 and 82. Each leg has a tab or lug 83 punched out of the material thereof forming an opening 84. The wing is pivoted on lugs 85 and 86 formed on a nut 87 which is threaded on the bolt 88. The lugs 85 and 86 have their outer ends beveled as shown at 90, the planes of the outer ends of the lugs converging.

It will be noted that the tabs 83 are inclined to the legs 81 and 82 at angles corresponding with the bevels or planes of the outer ends of the lugs 85 and 86. Thus the wing 80 will tend to take the position shown in Figs. 16 and 20 unless held in a position parallel to the nut as shown in Figs. 18 and 19.

In Fig. 19 it will be noted that the legs 81 and 82 are spread laterally when the wing is disposed parallel to the bolt. The force which tends to contract the legs to the position shown in Fig. 20 will also tend to rotate the wing so as to bring the bevelled ends of the lugs 85 and 86 into contact with the inclined surfaces of the tabs 83.

Figs. 21 to 26 inclusive

In this form of the invention each of the lugs 95 and 96 depending from the saddle member or nut 97 has formed therein preferably by punching out the material in the lugs, a pair of pockets 98 and 99. Each wing 100 has legs 101 and 102 provided with laterally bent ends 103 having bevelled end surfaces 104 adapted to seat in the pockets 98 or 99. The pockets as shown particularly in Fig. 22 have inner bevelled or angular surfaces 105. When the wings are spread to open position, the bevelled ends 104 seat in the pockets against the inclined surfaces 105. However, when the wings are folded, the ends ride out of the pockets to the position shown in Fig. 24 and the upper ends of the legs are contracted. Upon their release, however, the force which tends to spread the legs will cause the wings to swing outwardly to open position.

Figs. 27 to 29 inclusive

In this form of the invention the wings are carried directly by the bolt instead of by a nut or saddle member. The bolt 109 as shown in Figs. 27 and 29 has a pair of laterally extending lugs 110 and 11 which are elliptical or oval in section.

The wings 112 and 113 are pivoted on the lugs 110 and 111, each wing having its end portion 115 bent around to form an eye or substantially closed loop. When the wings are swung downwardly against the bolt, the eyes or loops will be partially opened but the resiliency of the material thereof will tend to cause the wing to swing outwardly to open position.

Figs. 30 and 31

In this form of the invention as in the embodiment shown in Figs. 27 to 29, the wings are carried directly by the bolt. The upper end 120 of the bolt 121 is flattened and is provided with a pair of openings 122 and 123.

The wings 124 and 125 are provided with U-shaped central portions 126 and 127 which extend through and are pivoted in the openings 122 and 123. Each wing also has a pair of legs 128 and 129 bent backwardly on the U-shaped portion, one of the legs of each wing having an eye 130 and the other leg having a hook 131 formed on the end thereof. The legs of the wings are disposed on opposite sides of the flattened portion 120 of the nut and the hook on the leg of one wing extends through the eye of the corresponding leg of the other wing, as clearly illustrated in Figs. 30 and 31.

When the wings are folded downwardly against the bolt, the legs of each wing are pressed against the U-shaped portion thereof due to the interlocking of the ends of the legs of the two wings. The resiliency of the wings, however, tends to force the legs away from the U-shaped portions thereof and spread the wings to the position shown in Fig. 30 or to open position.

Figs. 32 to 36 inclusive

In this embodiment of the invention, the saddle member 135 has pivoted thereto a pair of wings 136 and 137. Each wing has pivot lugs 138 and 139 extending laterally therefrom and also has formed thereon lugs 140 and 141.

Each wing is formed of resilient material and in this case, is formed of flat stock rather than round wire stock as in the preceding embodiments. From the showing in Fig. 36, it will be seen that the lugs 140 and 141 extend outwardly and as the wings are folded downwardly to the position shown in Figs. 34 and 35, these extensions or lugs bear against the edges 144 and 145 of the depending portions 146 and 147 formed on the saddle member 135. This causes the legs of the wings to contract as shown in Fig. 35 and the tension caused thereby, tends to swing the wings outwardly.

Figs. 37 and 38

In this form of the invention, the wings 150 and 151 are similar in construction to the wings 136 and 137 shown in Fig. 36 but differ therefrom in that no pivot lugs corresponding to the lugs 138 and 139 are provided. In Figs. 37 and 38, each wing has a pair of lugs 152 and 153 formed at the end thereof and having under surfaces 154 adapted to rest on inwardly extending lugs 156 and 157 formed on the saddle member 158. The engagement of the lugs 152 and 153 with the projections 156 and 157 limits the swinging movement of the wings to open position.

When the wings 150 and 151 are folded, the lugs 152 and 153 bear against the edges 159 and 160 of the depending portions 161 of the saddle member. This causes the lugs of the wings to contract in a manner similar to that described in connection with the preceding embodiments of the invention.

It will be clear from the description of the various embodiments of the invention that in each of these embodiments the resiliency of the wings and the coaction of the wings with the wing supports will cause the wings to automatically swing laterally or spread to open position when the are released. This form of construction eliminates all unnecessary parts, such as separate springs which act between the wings and the wing supports or saddle and, therefore, embodies a minimum number of parts.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A toggle head for use with a toggle bolt and comprising a wing supporting member and a wing carried thereby and adapted to swing relative thereto, said wing being formed of resilient material, said wing and member having interengaging portions so shaped and arranged that portions of the wing will be contracted when the wing is folded and will expand when the wing spreads to open position.

2. A toggle head for use with a toggle bolt and comprising a wing saddle member and a wing carried thereby and adapted to swing relative thereto, said wing being formed of resilient material, said wing and member having interengaging portions so shaped and arranged that portions of the wing will be contracted when the wing is folded and will expand when the wing spreads to open position.

3. A toggle head for use with a toggle bolt and comprising a wing saddle member and a wing carried thereby and adapted to swing relative thereto, said wing being formed of resilient material and having contractible and expansible portions, said wing and member having interengaging portions so shaped and arranged that said resilient portions of the wing will be tensioned when the wing is moved in one direction relative to the wing saddle member and will be relieved of tension when the wing moves in the other direction.

4. A toggle head for use with a toggle bolt and comprising a supporting member, and a wing pivotally associated with said member, said wing being formed of resilient material and comprising a pair of legs under stress tending to force said legs apart and the wing to open position, said wing and supporting member having cam means coacting to force the wing legs apart and cause the wing to swing to open position as the legs spread apart.

5. A toggle head for use with a toggle bolt and comprising a threaded member, a wing comprising legs formed of resilient material and pivoted on said threaded member, said legs and member being shaped and arranged to hold said legs under tension when the wing is in folded position, the connection between the threaded member and legs being shaped and arranged to cause the wing to swing to open position when the wing is released.

6. A toggle head adapted for use with a toggle bolt and comprising a supporting member, a wing pivotally associated with said member and formed of resilient material, said wing and member having portions coacting to effect the swinging of the wing to open position under force derived from the resiliency of the wing.

7. A toggle head for use with a toggle bolt and comprising a supporting member, a wing pivotally associated with said member and formed of resilient material, said member and wing being so shaped and arranged that the flexion of the wing tends to swing the wing to open position under tension due to the resiliency of the material thereof.

8. A toggle head for use with a toggle bolt and comprising a saddle member, and a wing pivoted thereon and comprising legs formed of resilient material and normally under tension tending to spread said legs apart and the wings to open position, said wing and saddle member having coacting cam means so relatively shaped and arranged that the tension tending to force the wing legs apart will cause the wing to swing to open position.

9. A toggle head for use with a toggle bolt and comprising a cam shaped saddle member, and a wing pivoted thereon and comprising legs formed of resilient material and normally under stress by said cam tending to spread said legs apart when the wing is folded, said wing legs and saddle member being so relatively shaped and arranged that the force tending to spread the legs will cause the wing to swing to open position.

10. A toggle head for use with a toggle bolt and comprising a wing supporting member and a wing carried thereby and adapted to swing relative thereto, said wing being formed of resilient material, said wing and member having interengaging portions so shaped and arranged that portions of the wing will be sprung in one direction when the wing is folded and will spring in the opposite direction when the wing moves in the other direction.

11. In combination, a toggle bolt comprising a member having a cam, an element pivotally associated with said member and engaged by said cam and having a resilient portion held at all times under stress thereby, said cam coacting with said resilient portion to swing said element on its pivot and being shaped and arranged to guide said portion from a position of lesser stress to a position of greater stress as the element is swung thereby relative to the member, and coacting means on said member and element for limiting the pivotal movement of the element when the resilient portion thereof reaches the position of lesser stress.

12. In combination, a member having cams, a toggle bolt comprising an element pivotally associated with said member and engaged by said cams and having resilient portions held under stress thereby, said cams being shaped and arranged to guide said portions from a position of greater stress to a position of lesser stress as the element is swung relative to the member, and coacting means on said member and element for limiting the pivotal movement of the element when the resilient portion thereof is disposed in the position of lesser stress.

13. In combination, a toggle bolt comprising a pair of members pivotally connected together, one of said members comprising a pair of portions adapted to be held under stress by the other member, said other member having a cam surface adapted to cause relative swinging movement of one member relative to the other in a manner to lessen the stress between the portions, said members having portions adapted to coact and form a stop to limit further relative pivotal movement in one direction when the stressed portions reach a position of lesser stress.

14. In combination, a toggle bolt comprising a pair of members pivotally connected together, one of said members comprising a pair of resiliently connected elements normally tending to spread apart, the other member having cam like portions engaging said elements and adapted to force said elements toward each other when one member is swung on its pivot relative to the other member and coacting means on said members for limiting the pivotal movement of one member relative to the other member when said elements are spread.

15. A toggle bolt structure comprising a bolt, and a U-shaped resilient wing pivotally associated therewith, and cams coacting with said wing to swing the wing on its pivot axis.

16. A toggle bolt structure comprising a saddle having cams formed thereon and resilient wings pivoted on said saddle and having portions engaging said cams and coacting therewith in a manner whereby the wings will be swung on their pivots.

17. A toggle bolt structure comprising a saddle having depending lugs provided with cams thereon and wings formed of resilient material pivoted on said lugs and having portions engaging said cams, said cams being constructed and arranged to swing said wings on their pivots.

18. In combination, a toggle bolt comprising a pair of pivotally connected members, one member having a cam and the other member having a resilient portion coacting therewith and at all times held under stress thereby, said cam being constructed and arranged to guide said portion from a position of lesser stress to a position of greater stress as the member having the resilient portion is swung relative to the other member.

19. A toggle head for use with a toggle bolt and comprising a supporting member and a wing carried thereby and adapted to swing relative thereto, said wing being formed of resilient material, and cam means acting between the wing supporting member and the resilient wing and opposed to the resiliency of the wing to swing the wing from folded to open position.

20. A toggle head for use with a toggle bolt and comprising a threaded member and a wing mounted to swing on said member, said wing having resilient portions movable toward and away from each other, and means coacting with said portions and opposed to the resiliency of said portions to swing the wing to open position.

21. A toggle head for use with a toggle bolt and comprising a threaded member and a wing mounted to swing on said member, said wing having resilient portions movable toward and away from each other, and cam means coacting with said portions and opposed to the resiliency of said portions to swing the wing to open position.

22. A toggle head for use with a toggle bolt and comprising a threaded member and a wing mounted to swing on said member, said wing comprising resilient legs, and coacting means between said legs and threaded member utilizing the force derived from the resiliency of the legs to swing the wing to open position.

23. A toggle head for use with a toggle bolt and comprising a wing saddle member and a wing carried thereby and adapted to swing relative thereto, said wing being formed of resilient material, and cam means acting between the wing and member to place the wing under tension as the wing is folded, the tension acting to spread the wing to open position upon release thereof.

24. A toggle head for use with a toggle bolt and comprising a supporting member and a wing pivotally associated therewith and formed of resilient material, and cam means coacting between said member and wing to place the wing under tension and effect the movement of the wing to open position under force derived from the wing tension.

25. A toggle head adapted for use with a toggle bolt and comprising a threaded supporting member, a wing pivotally associated with said member and formed of resilient material, said wing and member having cam acting portions coacting to effect the swinging of the wing to open position under force derived from the resiliency of the wing.

26. A toggle head for use with a toggle bolt and comprising a saddle member, and a wing pivoted thereon and comprising legs formed of resilient material and normally under stress tending to spread said legs apart, said wing legs and saddle member having cam means acting therebetween tending to spread the legs and cause the wing to swing to open position.

27. A toggle bolt head for use with a toggle bolt and comprising an arched saddle member, and wings pivoted thereon to swing from folded to open position relative thereto, the cross section of the saddle intermediate the pivots of the wing being substantially arcuate.

28. A toggle bolt head for use with a toggle bolt and comprising an arched saddle member having depending lugs formed thereon, and wings pivoted in said lugs and adapted to swing outwardly, the cross section of the saddle intermediate the pivots of the wing being substantially arcuate, the under surface of the saddle forming a stop to limit the movement of the wings to open position.

In witness whereof, I have hereunto set my hand this 2nd day of March, 1927.

CHARLES C. TOMKINSON.